Aug. 27, 1957 E. S. COOK 2,804,354
FLUID PRESSURE BRAKE APPARATUS
Filed Nov. 5, 1953
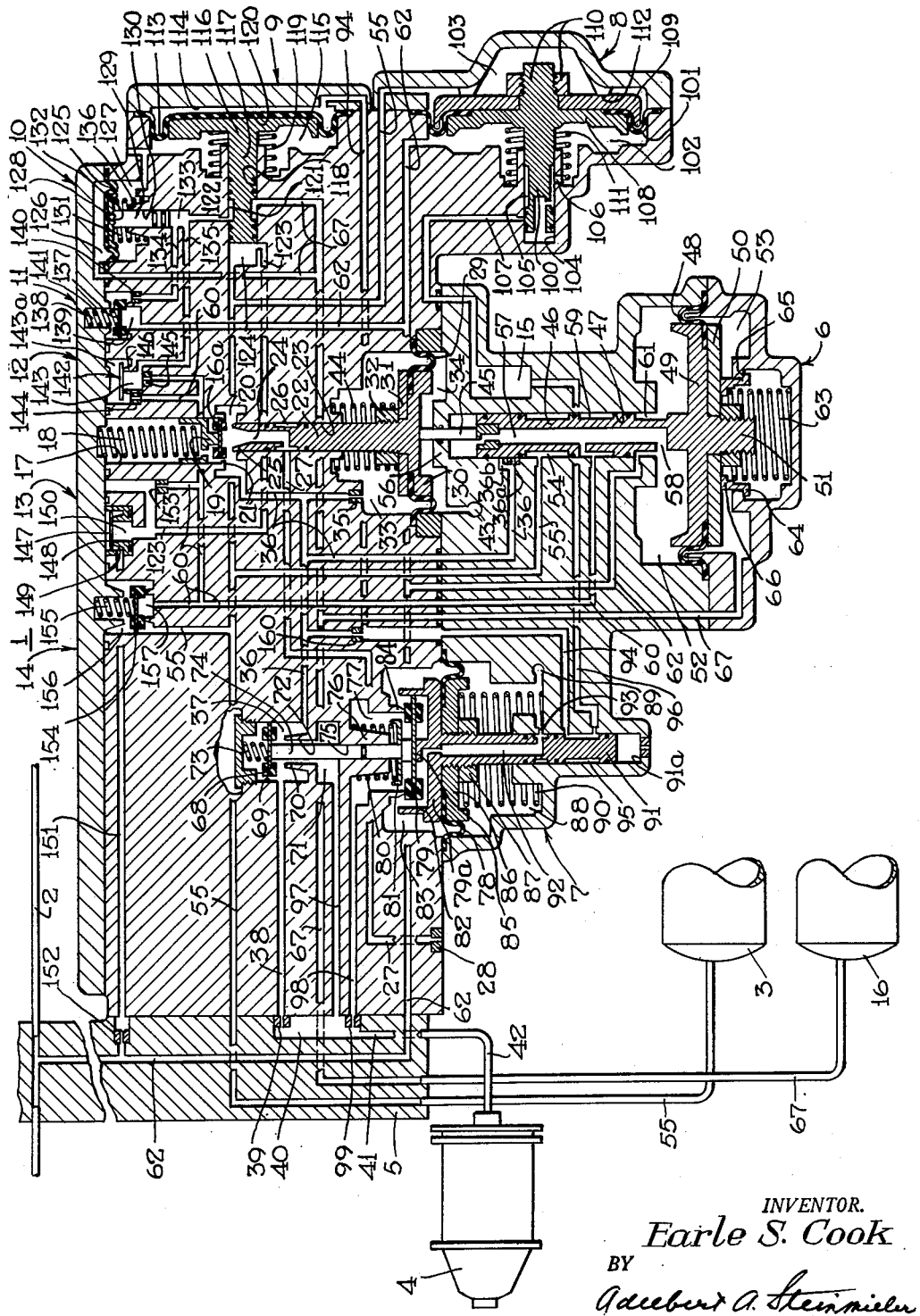
INVENTOR.
*Earle S. Cook*
BY
*Adelbert A. Steinmeier*
ATTORNEY

United States Patent Office 2,804,354
Patented Aug. 27, 1957

2,804,354

FLUID PRESSURE BRAKE APPARATUS

Earle S. Cook, Pittsburgh, Pa., assignor to Westinghouse Air Brake Company, Wilmerding, Pa., a corporation of Pennsylvania Application November 5, 1953, Serial No. 390,387

6 Claims. (Cl. 303—60)

This invention relates to fluid pressure brake apparatus and more particularly to fluid pressure brake apparatus of the graduated release type disclosed in my copending United States patent application, Serial No. 201,846, filed December 20, 1950, and assigned to the assignee of the present application, for use on European railway cars.

The prime object of the invention is to provide an improved brake apparatus of the above type which may be operated at full release or main reservoir pressure without causing overcharge of the equipment in the brake pipe for a longer period of time than was heretofore possible.

Another object of the invention is to provide a fluid pressure brake apparatus of the above type which will recharge the supply reservoir from the brake pipe during brake cylinder pressure maintaining supply of fluid under pressure from said supply reservoir to the brake cylinder device, and which will automatically cut off recharge communication from the brake pipe to the supply reservoir when such brake cylinder maintaining supply is above a certain rate corresponding to excessive leakage of fluid under pressure from the brake cylinder device.

Other objects and advantages of the invention will become apparent from the following more detailed description thereof.

In the accompanying drawings; the single figure is a diagrammatic view of a fluid pressure brake apparatus embodying the invention.

DESCRIPTION

As shown in the drawing, the brake equipment embodying the invention comprises a brake controlling valve device 1, adapted to operate in response to a reduction in pressure in a brake pipe 2 to control supply of fluid under pressure from a supply or auxiliary reservoir 3 to a brake cylinder device 4 to apply brakes on a railway car, and adapted to operate in response to charging of said brake pipe with fluid under pressure to charge said supply reservoir with fluid under pressure and to release fluid under pressure from said brake cylinder device.

The brake controlling valve device 1 comprises a pipe bracket 5 to which the brake pipe 2, supply or auxiliary reservoir 3, and brake cylinder device 4 are adapted to be connected and on one face of which is mounted a divided casing including a graduating control or service valve device 6, a brake cylinder inshot valve device 7, a quick service valve device 8, a charging valve device 9, a charging cut-off valve device 10, a control reservoir charging check valve device 11, a control reservoir overcharge check valve device 12, an auxiliary reservoir overcharge check valve device 13, and an auxiliary reservoir charging check valve device 14.

A control reservoir 16, disposed externally of the device 1, is also connected to the pipe bracket 5, and cast within a portion of the divided casing is a quick service reservoir volume chamber 15.

The graduating control or service valve device 6 comprises a brake cylinder release valve 16a of the poppet type which is slidably guided at its outer peripheral edge by the walls of a bore 17 and is urged by a light bias spring 18, disposed in said bore, through the medium of a spring follower 19 in the direction of a brake cylinder pressure chamber 20 into which one end of said bore opens. Movement of the valve 16a in the direction of chamber 20 by the bias spring 18 is limited by engagement of the valve 16a at its outer peripheral edge with an annular shoulder 21 formed in the casing at the open end of said bore. A release valve seat element 22 in the form of a cylindrical stem is slidably guided within a bore 23 which opens into the brake cylinder chamber 20 in coaxial alignment with the bore 17. The seat element 22 is provided with a brake cylinder release passage 24 which opens into the brake cylinder chamber 20 and is encircled by an annular release valve seat 25 at one end. Release passage 24 extends axially inward of said element 22 into open communication with an annular groove 26 formed in the outer periphery of said element. An atmospheric vent passage 27 is provided in the casing which is constantly open to the atmosphere at one end by way of a brake cylinder release control choke 28 and at its opposite end opens into the wall of the bore 23 at such a location relative to the groove 26 in element 22 that such end of the passage 27 will be opened to said groove when the annular seat 25 of said element 22 is disposed away from the brake cylinder release valve 16a.

The release valve seat element 22 is operably connected to a diaphragm 29 through the medium of a diaphragm follower member 30 formed integrally with said element 22, and a diaphragm follower member 31 clamped to member 30 through the medium of a nut 32. The diaphragm 29 is subject opposingly to pressure of fluid in a brake cylinder pressure chamber 22 at one side and to atmospheric pressure in a non-pressure chamber 34 at its opposite side. The brake cylinder pressure chamber 33 is in constantly open communication with the brake cylinder device 4 by way of a stabilizing choke 35, a branch of a brake cylinder passage 36 in constantly open communication with the brake cylinder chamber 20 and with the brake cylinder device 4 by way of a brake cylinder chamber 37 in the brake cylinder inshot valve device 7, a passage 38, a choke 39 in the pipe bracket 5, a header chamber 40, a passage 41, and a pipe 42. The non-pressure chamber 34 at the opposite side of the diaphragm 29 is constantly open to the atmosphere by way of a port and passage 43.

A light bias spring 44 disposed in the brake cylinder pressure chamber 33 in encirclement of the release valve seat element 22 cooperates with the casing and with the diaphragm follower member 31 to urge the diaphragm assemblage including diaphragm 29 in the direction of the non-pressure chamber 34 toward a reciprocable stem 45, for reasons which will hereinafter become apparent.

The graduating control or service valve device 6 is further provided with a stem type slide valve 46 for controlling admission of fluid under pressure from the auxiliary reservoir 3 to the brake cylinder device, and for controlling admission of fluid under pressure from the brake pipe to said auxiliary reservoir 3 and to the control reservoir 16 under certain operating conditions which will be described hereinafter. The valve 46 is disposed within a bore 47 in slidably guided and sealed cooperation with the walls thereof. The bore 47 is formed in coaxial alignment with the bores 17 and 23 and the uppermost end of the valve 46 abuts the respective end of the stem 45 engaged by the diaphragm follower member 30 associated with diaphragm 29. The opposite end of the valve 46 is operably connected to a resilient diaphragm 48 through the medium of a follower member 49, formed integrally with said valve, and a follower member 50 clamped to said member 49 through the medium of a stud and bolt arrangement 51. The diaphragm 48 is subject opposingly to pressure of fluid in a brake pipe pressure chamber 52 at one side and to pressure of fluid in a control reservoir pressure chamber 53 at its opposite side.

An annular groove 54 is formed in the outer periphery of the valve 46 for connective registry with upper and lower port ends 36b, 36a of a respective branch of the brake cylinder passage 36 and with the port end of an auxiliary reservoir passage 55 for communication of fluid under pressure from the latter passage to the former passage; such port ends of the two passages opening radialwise into the wall of the bore 47 in which said valve 46 is slidably disposed.

The auxiliary reservoir passage 55 is constantly open to the auxiliary reservoir 3 by way of branches of said passage 55 and a corresponding pipe 55 connected to said reservoir, while, as previously described, the brake cylinder passage 36 is constantly open to the brake cylinder device 4.

One end of the bore 47 is closed by an end wall 56 which separates the interior of such closed end of the bore from the atmospheric non-pressure chamber 34, while the opposite end of said bore 47 opens centrally into the brake pipe pressure chamber 52 at one side of the diaphragm 48. A central passage 57 extends through the valve 46 from the projecting end thereof to a point adjacent to the diaphragm follower member 49; the one end of said passage 57 opening into the interior of the bore 47 adjacent to the wall 56, while the opposite end of said opening 57 is in constantly open communication via a radial port 58 with the brake pipe pressure chamber 52. Equalization of pressure at opposite ends of the piston valve 46 is thereby established.

A reservoir charging groove 59 is also formed in the piston valve 46 for registry with the port end of a reservoir charging passage 60 which opens radialwise into the bore 47. The charging groove 59 is in constantly open communication with the central opening 57 extending through the valve 46, and thereby is in constantly open communication with the brake pipe pressure chamber 52.

A brake pipe pressure chamber charging groove 61 is also provided the valve 46 in the outer periphery thereof for registry with the port end of a brake pipe passage 62 to communicate fluid under pressure therefrom to the brake pipe pressure chamber 52.

Reciprocable movement of the slide valve 46 under the influence of the diaphragm 48 and/or the diaphragm 29 controls registry of the grooves 54, 59 and 61 with the passages 36, 55, 60 and 62, in manner as will be described hereinafter.

In addition, the graduating control or service valve device 6 comprises a retarded recharge control spring 63 in the form of a compression spring disposed in the control reservoir pressure chamber 53 and arranged to urge a circular or ring-like movable stop element 64 in the direction of chamber 52 toward a stop position in which it is shown in the drawing defined by engagement of an annular shoulder 65 thereof with a corresponding shoulder in a suitably shaped fixed annular stop 66 formed in the casing, for abutting engagement with the diaphragm follower member 50 in certain positions of the diaphragm stack, for reasons which hereinafter will become apparent.

The control reservoir pressure chamber 53 in the graduating control or service valve device 6 is constantly open to the control reservoir 16 by way of a control reservoir passage 67 and branches thereof and a corresponding pipe 67 connected to the said control reservoir.

Actually, during operation of the service valve device 6 the slide valve 46 may be caused to assume an infinite number of positions relative to the casing, but, for sake of simplification said valve will hereinafter be referred to as having an application, a release, a retarded recharge, a brake cylinder maintaining, and a lap position according to position of the grooves 54, 59 and 61 relative to the passages with which same may be in communication.

The release position of the service valve device 6 is hereby defined to be that position of the diaphragm stack including diaphragms 29 and 48 in which the release valve seat 25 of element 22 is disposed away from the release valve 16a, and in the slide valve 46 the brake cylinder supply groove 54 is out of registry with the brake cylinder passage 36, the charging groove 59 is in registry with the reservoir charging passage 60, and the brake pipe pressure chamber charging groove 61 is in registry with the brake pipe passage 62, while the diaphragm member 50 may or may not be in abutment with the movable stop element 64 while same remains in contact with the fixed stop element 66.

The application position of the service valve device 6 is hereby defined to be that position of the diaphragm stack in which the release valve seat 25 of release valve seat element 22 is in seating engagement with the release valve 16a, and in the slide valve 46 the brake cylinder supply groove 54 is in registry with the auxiliary reservoir passage 55 and with both the top and bottom ports 36a, 36b of the brake cylinder passage 36, the reservoir charging groove 59 is out of registry with the reservoir charging passage 60, and the brake pipe pressure chamber charging groove 61 is in registry with the brake pipe passage 62.

The brake cylinder maintaining position of the service valve device 6 is hereby defined to be that position of the diaphragm stack in which the release valve seat 25 of element 22 is in seating engagement with the release valve 16a, and in the slide valve 46, the brake cylinder supply groove 54 is in registry with the auxiliary reservoir passage 55 and with the bottom and restricted port 36a of the brake cylinder passage 36, the reservoir charging groove 59 is in registry with the reservoir charging passage 60, and the brake pipe pressure chamber charging groove 61 is in registry with the brake pipe passage 62.

The lap position of the service valve device 6 is hereby defined to be that position of the diaphragm stack in which the release valve seat 25 is in engagement with the release valve 16a, and in the slide valve 46 the brake cylinder supply groove 54 is in registry with the reservoir passage 55 but out of registry with either of the brake cylinder passage ports 36a, 36b, the reservoir charging groove 59 is in registry with the reservoir charging passage 60, and the brake pipe pressure chamber groove 61 is in registry with the brake pipe passage 62.

The retarded recharge position of the service valve device 6 is hereby defined to be that position of the diaphragm stack in which the release valve seat 25 is out of engagement with release valve 16a, and in the slide valve 46 the brake cylinder supply groove 54 is out of registry with the ports 36a, 36b of the brake cylinder passage 36, the reservoir charging groove 59 is in registry with the reservoir charging passage 60, and the brake pipe pressure chamber charging groove 61 is either out of registry with or in partial registry with the port end of the brake pipe passage 62, while the diaphragm follower member 50 is in abutment with the movable stop element 64 held unseated from stop 66 against opposition of the spring 63.

The brake cylinder inshot valve device 7 comprises a poppet type valve 68 which is slidably guided at its outer peripheral edge within the walls of a bore 69 for cooperation with an annular seat 70 to control communication between the brake cylinder pressure chamber 37 and a brake cylinder pressure chamber 71 by way of a central opening 72 extending between said chambers. A bias spring 73 urges the valve 68 in the direction of its seat 70, while a valve actuating stem 74 extending through the chamber 71 and the opening 72 into chamber 37 is provided for effecting unseating of the valve 68 against opposition of spring 73. The actuating stem 74 extends slidably through a bore 75 in a partition 76 which divides the chamber 71 from a chamber 77 in which the latter chamber the respective end of the stem 74 projects. The lowermost end of the stem 74 as viewed in the drawing, is operably connected to a diaphragm 78 through the medium of a diaphragm operation modifying valve 79 and a diaphragm follower member 79a associated with said diaphragm 78. Such operable connection of stem 74 with diaphragm 78 is maintained by virtue of a compression spring 80 disposed in the chamber 77 and arranged to urge the lowermost end of the stem 74 into abutting engagement with the central portion of the valve 79 through the medium of annular spring follower element 81 encircling said stem 74 and abutting an annular shoulder formed therein.

The follower member 79a is provided with an annular sleeve-like element 82 which projects into a chamber 83 in encirclement of an annular seat 84 at an opening of the chamber 77 with said chamber 83. The annular seat 84 accommodates the valve 79 for seating engagement therewith, while the sleeve-like element 82 retains the valve 79 for proper registry with the seat 84 during self-aligning movement of the valve. A centrally projecting portion 85 of the diaphragm follower member 79a projects into the interior of the sleeve-like element 82 for abutting engagement with the underside of the valve 79 against which portion 85 said valve 79 is urged by the spring 80 through the medium of the actuating stem 74.

The diaphragm follower member 79a is suitably clamped for movement with the deflection of the diaphragm 78 by cooperation with a corresponding diaphragm follower member 86 held in place by a bolt 87 in screw-threaded attachment with a stud portion of said follower member 79a.

One face of the diaphragm 78 is exposed to pressure of fluid in the chamber 83, while the opposite face of said diaphragm is exposed to atmospheric pressure in a non-pressure chamber 88 which is constantly open to the atmosphere by way of a port 89. A control spring 90 is disposed in the non-pressure chamber 88 and arranged to urge, through the medium of the diaphragm follower member 86, the assemblage including diaphragm 78 in the direction of the chamber 83 toward the position in which said assemblage is shown in the drawing and in which the valve 79 is closed in seating engagement with the seat 84 and the valve 68 is held away from its seat 70 by virtue of the position of stem 74.

Also operably connected to diaphragm 78 there is a piston valve 91 which is secured for movement with deflection of the diaphragm 78 by integral attachment with a centrally projecting portion of the diaphragm follower member 79a. The piston valve 91 includes a longitudinally extending passage 92 which is constantly open at its uppermost end, as viewed in the drawing, with the chamber 83 and which is provided with a radial port 93 adapted for registry with a port 93 opening into non-pressure chamber 88 when the diaphragm 78 is in the position in which it is shown in the drawing, and for registry with the port end of a charging valve control chamber passage 94 when the diaphragm 78 and assemblage is at an opposite position to be described subsequently.

An annular groove 95 formed in the outer periphery of the piston valve 91 is also provided for establishing communication between the quick service volume chamber 15 by way of a passage 96 and the passage 94 when said piston valve 91 is in the position in which it is shown in the drawing, and to disestablish such communication when said valve is caused to assume an alternate position subsequently to be described.

In the brake cylinder inshot valve device 7 the brake cylinder pressure chamber 71 is in constantly open communication with the brake cylinder device 4 through the medium of a passage 97, the header chamber 40, passage 41, and the pipe 42, while the chamber 77 in said device 7 is also in constantly open communication with said brake cylinder device 4 through the medium of a passage 98, a choke 99, and said header chamber 40.

In operation of the brake cylinder inshot valve device 7, when the brake cylinder pressure as experienced in the chamber 77 in said device 7 is below such as six pounds said device 7 will assume the position in which it is shown in the drawing and in which the poppet valve 68 is held off its seat 70 to establish communication between the chambers 37 and 71, the valve 79 will be seated and closing off the said chamber 77 from the chamber 83, and the slide valve 91 will be positioned to establish communication between said chamber 83 and the atmosphere by way of the passage 92 and the non-pressure chamber 88, while the groove 95 is in registry with the passages 94 and 96 to establish communication therebetween for reasons which hereinafter will become apparent.

Conversely, when the brake cylinder pressure as experienced in the chamber 77 increases to and above ten pounds, such pressure as exerted on the valve 79 within the confines of the annular seat 84 will be sufficient to overcome the opposition of the control spring 90 and cause movement of the diaphragm assemblage including valve 91 in the direction away from said seat 84, thereby establishing communication between said chamber 77 and the chamber 83 and allowing flow of fluid under pressure from the former into the latter by way of the unseated valve 79. Upon such flow of fluid under pressure into the chamber 83 the entire area of the diaphragm assemblage including the diaphragm 78 becomes exposed to the pressure of such fluid and completes movement in the direction of chamber 88 at a more rapid rate to a normal brake cylinder supply position defined by engagement of the lowermost end of the valve 91 with an annular shoulder 91a formed in the casing and in which position the poppet valve 68 will be seated and closing off the chamber 37 from the chamber 71, and in the valve 91 the port 93 will be in registry with the passage 94 to establish communication between the brake cylinder chamber 77 and said passage 94 by way of the chamber 83 and the passage 92, while the groove 95 will be out of registry with said passage 94.

Subsequent reduction in brake cylinder pressure as experienced in chamber 77 from a value in excess of ten pounds to a value less than six pounds will allow the diaphragm assemblage including diaphragm 78 to move in the direction of said chamber 77 and reopen through actuation of the stem 74 the poppet valve 68 and, whereupon chambers 37 and 71 are again connected via the opening 72, the valve 79 again engages its seat 84, thereby closing off the chamber 77 from the chamber 83, and the valve 91 again becomes positioned to establish registry of passage 92 with the port 93 and registry of the groove 95 with both the passage 96 and the passage 94.

The quick service valve device 8 comprises a piston-type slide valve 100 which is operably connected to a diaphragm 101 subject opposingly to pressure of fluid in a brake pipe pressure chamber 102 at its one side and to pressure of fluid in an auxiliary reservoir chamber 103 at its opposite side. The slide valve 100 is slidably guided within a counterbore 104 which opens into the chamber 102 and an annular quick service supply groove 105 is formed in the outer periphery of the valve 100. A radial port 106 formed in the casing constantly communicates groove 105 with the brake cylinder pressure chamber 102, and the groove 105 is so proportioned and disposed relative to a quick service volume supply passage 107 as to be in registry therewith when the valve 100 is caused to assume a quick service position defined by engagement of the end of said valve with the end wall of the counterbore 104. The valve 100 may be formed integrally with a diaphragm follower member 108 which is suitably clamped to the diaphragm 101 by cooperation with a corresponding diaphragm follower member 109 secured in place through the medium of a stud and bolt arrangement 110. A light bias spring 111 is disposed in the brake pipe pressure chamber 102 and arranged in cooperation with the diaphragm follower member 108 to urge movement of the diaphragm 101 in the direction of the auxiliary reservoir pressure chamber 103 to a quick service cut-off position in which the assemblage including the valve 100 is shown in the drawing and which position is defined by engagement of the follower member 109 with an annular stop shoulder 112 formed in the casing.

In the quick service valve device 8, the auxiliary reservoir pressure chamber 103 is in constantly open communication with the auxiliary reservoir 3 by way of a respective branch of the auxiliary reservoir passage 55 and pipe 55, and the brake pipe pressure chamber 102 is in constantly open communication with the brake pipe 2 by way of the respective branches of the brake pipe passage 62.

In operation of the quick service valve device 8, when the brake pipe pressure as experienced in the brake pipe pressure chamber 102 is in excess of or substantially equal to the auxiliary reservoir pressure as experienced in chamber 103, the quick service valve device will assume the quick service cut-off position in which it is shown in the drawing and in which position the slide valve 100 will be so disposed that the groove 105 will be out of registry with the quick service volume supply passage 107 so that same will be cut off from the brake pipe pressure chamber 102. When the brake pipe pressure as experienced in chamber 102 reduces slightly below that of auxiliary reservoir pressure existent in chamber 103 to the extent of such as a fraction of a pound, for example, as during initiation of a brake application, the resultant preponderance in pressure of fluid in the chamber 103 in acting on the diaphragm 101 will cause movement of said diaphragm or deflection of said diaphragm in the direction of chamber 102, with consequent movement of the valve 100 to its quick service position in which the groove 105 is brought into registry with the quick service volume supply passage 107, thereby establishing communication between said passage and the brake pipe pressure chamber 102, for reasons which hereinafter will become apparent.

The charging valve device 9 comprises a diaphragm 113 subject opposingly to pressure of fluid in a charging valve control chamber 114 on one side and to atmospheric pressure in a non-pressure chamber 115 at its opposite side. The diaphragm 113 is clamped to a diaphragm follower member 116 which in turn is integrally attached to one end of a piston-type slide valve 117 projecting through the non-pressure chamber 115 and into a counterbore 118, the peripheral wall of which counterbore serves to slidably guide reciprocable movement of said valve.

The light bias spring 119 is disposed in the non-pressure chamber 115 and acts on the follower member 116 to urge the diaphragm and valve 117 in the direction of the charging valve control chamber 114 to a charging position of said components defined by engagement of said diaphragm with a stop shoulder 120 formed in the casing.

A groove 121 is formed in the outer periphery of the valve 117 and so proportioned and arranged relative to disposition of a branch of the control reservoir passage 67 opening into the bore 118 and to disposition of a control reservoir charging passage 122 also opening into said bore, that, when said valve 117 is in its charging position in which it is shown in the drawing, passages 67 and 122 will be in communication via said groove. An auxiliary reservoir charging passage 123 also opens radialwise into the cylindrical wall of the counterbore 118 at a point such that when the valve 117 is in its charging position in which it is shown in the drawing said port or passage will be uncovered to the interior of said counterbore between the projecting end of said valve and the end wall of said counterbore, which space or volume will hereinafter be referred to as an auxiliary reservoir pressure chamber 124 which is constantly open to the auxiliary reservoir 3 by way of a respective branch of the auxiliary reservoir passage 55.

Disposition of the port end of the passage 123 relative to the end of the valve 117, and of the port ends of passages 67 and 122 relative to the groove 121, as well as the value of the spring 119, are so constructed and arranged that in operation of the charging valve 9 when the pressure of fluid in the charging valve control chamber 114 is substantially at atmospheric pressure, the spring 119 will cause the components of said valve device 9 to assume the position in which they are shown in the drawing, previously referred to as the charging position of said valve, and in which position the groove 121 is in communicative registry with the passages 67 and 122, and the port end of the passage 123 is uncovered to the chamber 124. Upon increase in pressure of fluid in the charging valve control chamber 114 to a value slightly in excess of atmospheric pressure, such pressure in acting on the diaphragm 113 will be sufficient to cause deflection of same in the direction of the non-pressure chamber 115, and through a resultant movement of the diaphragm follower member 116 in the direction of said non-pressure chamber, will cause movement of the valve 117 to a charging cut-off position defined by engagement of the end of the valve 117 with the end wall of the counterbore 118, in which position the groove 121 is out of registry with the control reservoir passage 67 and said valve covers the port end of the auxiliary reservoir charging passage 123 which, consequently, is out of communication with the auxiliary reservoir pressure chamber 124. Subsequent reduction in pressure of fluid in the charging valve control chamber 114 to a value substantially equal to atmospheric pressure, will allow the components of device 9 including the valve 117 to assume the charging position previously defined and in which they are shown in the drawing.

The charging cut-off valve device 10 comprises a resilient diaphragm 125 subject opposingly to pressure of fluid in a control reservoir pressure chamber 126 at one side and to atmospheric pressure in a non-pressure chamber 127 at its opposite side. The diaphragm 125 is operatively connected through the medium of a diaphragm follower member 128 to one end of a piston-type slide valve 129 which extends through the non-pressure chamber 127 and into a counterbore 130. A control spring 131 is disposed in the non-pressure chamber 127 and arranged in abutment with the diaphragm follower member 128 at one end to urge the diaphragm 125 and piston valve 129 to the positions in which they are shown in the drawing defined by engagement of said diaphragm with a stop shoulder 132 formed in the casing. The end surface of the valve 129, the peripheral wall of the counterbore 130 and the end wall thereof define a control reservoir charging chamber 133 within said counterbore, said chamber 133 being in constantly open communication with the control reservoir charging passage 122. A pair of control reservoir charging passages 134 and 135 open radially inward of the peripheral wall of the counterbore 130 adjacent to the lowermost end wall of said counterbore. The disposition of the passages 134 and 135 relative to the end wall of the counterbore 130 and relative to the length of the valve 129 are such that when said valve is in a position in which it is shown in the drawing, both of said passages will be open to the chamber 133, and when the piston valve 129 is caused to assume an opposite position by deflection of the diaphragm 125 in the direction of non-pressure chamber 127, which position is defined by engagement of the follower member 128 with an annular stop shoulder 136 formed in the casing, said valve 129 will close off passage 134 to chamber 133 while passage 135 remains open to said chamber 133.

The control reservoir charging check valve device 11 comprises a control reservoir charging check valve 137 for controlling communication between a control reservoir charging chamber 138 at one side and a brake pipe pressure chamber 139 at its opposite side. The control reservoir charging chamber 138 is in constantly open communication with the control reservoir charging passage 134 by way of a choke 140, while the brake pipe pressure chamber 139 is in constantly open communication with a branch of the brake pipe passage 62. The check valve 137 is constantly biased toward a seated position in which it is shown in the drawing by action of a light bias spring 141 disposed in the chamber 138, and said valve 137 is arranged to prevent flow of fluid under pressure from the chamber 138 into the chamber 139, and to allow flow of fluid under pressure in the reverse direction, i. e., from said chamber 139 into said chamber 138.

The control reservoir overcharge check valve device 12 comprises a control reservoir overcharge check valve 142 subject opposingly to pressure of fluid in a control reservoir overcharge dissipation chamber 143a at one side and to pressure of fluid in the control reservoir charging chamber 143 at its opposite side. The control reservoir overcharge dissipation chamber 143a is in constantly open communication with a respective branch of the reservoir charging passage 60 by way of an overcharge dissipation choke 144, while the control reservoir charging chamber 143 is in constantly open communication with another branch of said passage 60 by way of a charge-rate-limiting choke 145 and with the passage 135 without restriction. The check valve 142 is arranged relative to its seat 146 to prevent flow of fluid under pressure from the chamber 143a into the opposite chamber 143 while allowing flow of fluid under pressure in the reverse direction.

The auxiliary reservoir overcharge check valve device 13 comprises an auxiliary reservoir overcharge check valve 147 arranged in cooperation with a seat 148 to prevent flow of fluid under pressure from a brake pipe pressure chamber 149 at one side into an auxiliary reservoir overcharge chamber 150 at its opposite side, while permitting flow of fluid under pressure between these chambers in the opposite direction. The brake pipe pressure chamber 149 is in constantly open communication with the brake pipe 2 by way of a brake pipe passage 151, an overcharge dissipation choke 152, and a branch of the brake pipe passage 62, while the auxiliary reservoir overcharge chamber 150 is in constantly open communication with the auxiliary reservoir charging passage 123 without restriction and is also connected with a respective branch of the reservoir charging passage 60 by way of a choke 153.

The auxiliary reservoir charging check valve device 14 comprises an auxiliary reservoir charging check valve 154 biased by a control spring 155 toward a seated position for preventing flow of fluid under pressure from an auxiliary reservoir pressure chamber 156 into an auxiliary reservoir charging chamber 157, while pemitting flow of fluid under pressure from the chamber 157 into the chamber 156 when the pressure in the former chamber is greater than that in the latter chamber by a certain degree to be described hereinafter.

The auxiliary reservoir pressure chamber 156 in device 14 is in constantly open communication with the auxiliary reservoir 3 by way of a respective branch of branches of the auxiliary reservoir passage 55 and corresponding pipe 55, while the chamber 157 is in constantly open communication with the respective branch of the reservoir charging passage 60.

OPERATION

With the brake equipment void of fluid under pressure, all parts of the equipment will assume the positions in which they are shown in the drawing.

*Initial charging of the brake equipment*

To initially charge the brake equipment on a train, as well as recharge the brake equipment during release of the brakes after a brake application, it is customary to move the usual engineer's brake valve device (not shown) on the locomotive first to a release position for supplying fluid at a relatively high pressure directly from the usual main reservoir on the locomotive to the brake pipe 2 at the locomotive, and thence after the lapse of a period of time, as determined by the operator of the brake valve device according to different conditions, the brake valve device will be moved to running position to reduce the pressure of further supply of fluid to the brake pipe to a normal value for continued charging of the brake pipe throughout the train to the normal pressure to be carried therein. The pressure in the brake pipe on the first, perhaps fifteen, cars of the train will therefore be initially increased to a degree in excess of the degree normally carried. The degree of such overcharge of the brake pipe being greatest on the car coupled to the locomotive and decreasing from car to car back from the locomotive; the above-mentioned time which the brake valve device is allowed to remain in release position as well as the number of cars in the train and the equipment thereon, determines the number of cars on which the brake pipe becomes overcharged and of what duration.

Upon supply of fluid under pressure to the brake pipe 2 as above, to charge the control and auxiliary reservoirs 16 and 3 on each car employing the subject brake equipment, on any particular car, fluid under pressure from the brake pipe 2 will flow by way of the brake pipe passage 62 and brake pipe pressure chamber charging groove 61 in the service valve device 6 into the brake pipe pressure chamber 52 therein, and, via other branches of brake pipe passage 62, such brake pipe fluid will flow into the brake pipe pressure chamber 102 in the quick service valve device 8 and to the chamber 139 in the control reservoir charging check valve device 11.

Fluid under pressure from the brake pipe passage 62 supplied to the chamber 139 in device 11 and acting on control reservoir charging check valve 137 will unseat same against the opposition of light bias spring 141 and will flow into and through the chamber 138, the choke 140, the control reservoir charging passage 134, control reservoir charging chamber 133 in the charging cut-off valve device 10, the control reservoir charging passage 122, the control reservoir charging groove in the slide valve 117 of the charging valve device 9, and the respective branches of the control reservoir passage 67 and pipe 67 to the control reservoir 16 where same will become charged at a relatively rapid rate. The control reservoir pressure as simultaneously experienced also in the control reservoir pressure chamber 53 of the service valve device 6 will allow the slide valve 46 of said device 6 to remain positioned relative to the port end of the brake pipe passage 62 so that the brake pipe fluid may be admitted to the brake pipe pressure chamber 52 by way of the groove 61 at a corresponding rapid rate.

At the same time, brake pipe fluid admitted to the brake pipe pressure chamber 52 in the service valve device 6 will flow by way of the port 58 and central opening 57 in the slide valve 46 of the service valve device 6, via groove 59 in said valve, into the reservoir charging passage 60, thence, via check valve 154 and the chambers 157 and 156 against opposition of the spring 155 in the auxiliary reservoir charging valve device 14, such brake pipe fluid will flow to the auxiliary reservoir 3 by way of the auxiliary reservoir passage and pipe 55 to charge said auxiliary reservoir at a relatively rapid rate.

In addition to such flow of fluid under pressure to the control reservoir 16 and to the auxiliary reservoir 3 as above described, fluid under pressure admitted to the reservoir charging passage 60 from the brake pipe pressure chamber 52 in said valve device 6 as above described will also flow at a slower rate to the control reservoir 16 by way of the choke 145, and the chamber 143 in the control reservoir charging check valve device 11, the passage 135, and the chamber 133 in the charging cut-off valve device 10, as well as to the auxiliary reservoir 3 by way of the choke 153, the chamber 150 in the auxiliary reservoir over-charge check valve device 13, the passage 123, the chamber 124 in the charging valve device 9, and pipe and passage 55.

It should be pointed out, that during the time the brake pipe fluid is flowing from the brake pipe passage 62 into the brake pipe pressure chamber 52 in service valve device 6 by way of groove 61 in the valve 46, even though the brake pipe may be at main reservoir pressure and therefore in considerable excess of that pressure normally carried in the brake pipe, the pressure of fluid in the brake pipe pressure chamber 52 is maintained at a value not more than such as seven-tenths of a pound in excess of that gradually increasing pressure in the control reservoir pressure chamber 53 at the opposite side of the diaphragm 48. Should the pressure of fluid in the brake pipe pressure chamber 52 tend to exceed the control reservoir pressure in chamber 53 by more than seven-tenths of a pound, under influence of the preponderance in pressure in the chamber 52 over that in chamber 53, the diaphragm 48 will deflect in the direction of chamber 53 and carry the movable stop element 64 away from the fixed stop element 66 against opposition of the retarded recharge control spring 63. Such deflection of the diaphragm 48 in the direction of chamber 53 will carry the valve 46 in the same direction and bring the uppermost end of the groove 61, as viewed in the drawing, into only partial registry with the port end of the brake pipe passage 62 as to so restrict admittance of brake pipe fluid from passage 62 into the chamber 52 as will re-establish equilibrium in pressure across the diaphragm and thereby limit the pressure of fluid existent in the brake pipe pressure chamber 52 to a value less than seven-tenths of a pound greater than control reservoir pressure in the chamber 53.

According to a principal feature of the invention, when the control reservoir pressure attains a value such as sixty-five pounds, six pounds less than the normal value desired to be carried, such pressure as experienced in the control reservoir pressure chamber 126 in the charging cut-off valve device 10 will cause deflection of the diaphragm 125 in the direction of the non-pressure chamber 127 against opposition of the spring 131 until the diaphragm follower member 128 engages the stop shoulder 136. The valve 129 is thus carried to its position in which the control reservoir charging passage 134 is closed off to the chamber 133 and thereby to the control reservoir, while continued supply of fluid under pressure to the control reservoir to raise its pressure from sixty-five pounds to the desired normal pressure of seventy-one pounds occurs at a trickle rate from the reservoir charging passage 60 by way of the choke 145, the chamber 143 in the control reservoir overcharge check valve device 12, the passage 135, chamber 133 in device 10, the control reservoir charging passage 122, the groove 121 in valve 117 of charging valve device 9, and passage and pipe 67 as previously described.

It will be appreciated from the foregoing that during the time that the control reservoir pressure is below sixty-five pounds and the charging cut-off valve device 10 therefore is in its uppermost position, fluid under pressure from the overcharged brake pipe 2 will flow as previously described by way of the choke 140 and the chamber 133 in said device 10 to the control reservoir at a relatively rapid rate so that said reservoir may be initially charged to sixty-five pounds within the time of such as one minute for example, while upon attainment of the control reservoir pressure of sixty-five pounds and consequent movement of the valve 129 in charging cut-off valve device 10 to its lowermost position to cut off such rapid supply to the control reservoir by way of passage 134, the resultant trickle rate of flow of the control reservoir by way of the passage 135 and chamber 133 in device 10, in occurring at such slow rate by virtue of the restriction imposed by the choke 145 to raise the control reservoir pressure from sixty-five pounds to the normal value of seventy-one pounds will prolong the period in which no overcharging of the control reservoir will occur.

It should also be pointed out that during charging of the control reservoir to sixty-five pounds, the pressure of fluid from the overcharged brake pipe existent at the input side of the choke 140 greatly exceeds that pressure existent in passage 134 at the output side of the choke 140 and flow of fluid through the choke at a rapid rate is thus encouraged, while by virtue of the action of the service valve device 6 in limiting the pressure of fluid in the brake pipe pressure chamber 52 and thus in the reservoir supply passage 60 to a value less than seven-tenths of a pound more than control reservoir pressure, the differential across the choke 145 will not exceed seven-tenths of a pound and thus rapid flow to the control reservoir by way of said choke and the passage 135 when the charging cut-off valve device 10 closes, will be discouraged by virtue of such low differential in pressure and the restriction imposed by said choke 145.

At the time that the pressure of fluid in the auxiliary reservoir being supplied with fluid under pressure from the reservoir charging passage 60 by way of the auxiliary reservoir charging check valve device 14 attains a value within one and seven-tenths pounds of the pressure in said passage 60, the spring 155 in device 14 will cause closure of the check valve 154.

After closure of the auxiliary reservoir charging check valve 154 upon charging of the auxiliary reservoir 3 to within one and seven-tenths pounds of the pressure of fluid as existent in passage 60, the final stage of initial charging of the auxiliary reservoir 3 to raise its pressure from such as sixty-nine and three tenths pounds to the normal charge value of seventy-one pounds, for example, will occur at a restricted rate by way of a respective branch of the passage 60, the auxiliary reservoir charge control choke 153, the chamber 150 in check valve device 13, the auxiliary reservoir charging passage 123, the auxiliary reservoir charging chamber 124 in the charging valve device 9, and passage and pipe 55. Such final stage of initial charging of the auxiliary reservoir 3 by way of the choke 153 to attain the normal charge pressure of seventy-one pounds will occur in about twenty seconds.

If during such charging of the auxiliary and control reservoirs 3 and 16, the brake pipe 2 remains overcharged for a time after such auxiliary and control reservoirs are charged to their normal value of seventy-one pounds, then these reservoirs will tend to become overcharged at a restricted rate by way of the chokes 153 and 145, respectively, as above described, by flow along the path as above described.

Should the control reservoir 16 become overcharged, then, upon re-establishment of normal pressure in the brake pipe 2 to seventy-one pounds, for example, the overcharge in the control reservoir 16 will be dissipated at a relatively rapid but controlled rate by flow of fluid under pressure from said control reservoir by way of the pipe and passage 67, the control reservoir charging groove 121 in the charging valve device 9, the control reservoir charging passage 122, the control reservoir charging chamber 133 in the charging cut-off valve device 10, the control reservoir charging passage 135, the chamber 143 in the control reservoir overcharge check valve device 12, the choke 145 and the choke 144 by way of the unseated check valve 142, and respective branches of the reservoir charging passage 60, to the brake pipe passage 62 by way of the reservoir charging groove 59, the central opening 57 and port 58 in the slide valve 46, the brake pipe pressure chamber 52, and the groove 61 of valve 46 in service valve device 6.

It should be pointed out, that during the time that overcharge may be in admission to the control reservoir 16, such will flow by way of the single choke 145 in the control reservoir overcharge check valve device 12 at a low pressure differential controlled by service valve device 6, while during dissipation of such overcharge by flow of fluid under pressure from the control reservoir 16, the additional choke 144 in the control reservoir overcharge check valve device 12 is brought into play by virtue of the check valve 142, so that overcharge will be dissipated at a faster rate than same is admitted to said control reservoir to reduce the tendency for such control reservoir to be overcharged at a time when a subsequent brake application may be called for.

Correspondingly, when, upon existence of an overcharge in the auxiliary reservoir 3, the pressure of fluid in the brake pipe 2 is reduced to its normal value of seventy-one pounds, for example, such overcharge in the auxiliary reservoir will be dissipated at a relatively rapid but controlled rate by flow of fluid under pressure therefrom by way of the pipe and passage 55, the auxiliary reservoir charging chamber 124 in the charging valve device 9, the auxiliary reservoir charging passage 123, the chamber 150 in the overcharge check valve device 13, directly by way of the check valve 147 in said device 13, the brake pipe passage 151, the choke 152 and the brake pipe passage 62, and indirectly from chamber 150 by way of the choke 153, the reservoir charging passage 60, and the previously identified flow path through the service valve device 6 into the brake pipe passage 62. As in regard to flow of final charge into the control reservoir 16 and the dissipation of any overcharge therefrom, it will be seen that the choke 153 will discourage entrance of overcharge into the auxiliary reservoir 3 while the feature of the capacity of same being automatically combined with the capacity of choke 152 provides for relatively rapid dissipation of such overcharge to reduce the tendency for such auxiliary reservoir to be overcharged at a time when a brake application may be called for subsequently.

Effecting application of brakes

When it is desired to effect an application of brakes, a reduction in pressure in the brake pipe 2 will be initiated by the engineer's brake valve device on the locomotive in the well-known manner. In the brake equipment on any particular car, when the brake pipe pressure is reduced as just mentioned, the check valve 154 will prevent any substantial flow of fluid under pressure from the auxiliary reservoir 3 to the brake pipe by way of the charging passage 60, while the charging cut-off valve device 10 in its lowermost position as viewed in the drawing, will prevent any substantial flow of fluid under pressure from the control reservoir 16 back to the brake pipe by way of said passage 60. However, momentarily there will be a slight trickle from the auxiliary reservoir 3 back to the brake pipe by way of said reservoir charging passage 60 and the service valve device 6 via the choke 153, and from the control reservoir 16 by way of the charging valve device 9, passage 122, chamber 133 in device 10, passage 135, the chamber 143 in device 11, and the choke 145. Such slight momentary back flow from these reservoirs 3 and 16 by way of the chokes 153 and 145, respectively, is of no consequence during the operation under consideration, however.

As a result of the initial reduction in brake pipe pressure as effected by operation of the engineer's brake valve device on the locomotive, the pressure in the brake pipe 2 on the first car of the train will promptly reduce to that on the locomotive and when reduced, for example, four-tenths of a pound, such reduction as experienced in the brake pipe pressure chamber 102 in the quick service valve device 8 relative to the pressure of fluid in the auxiliary reservoir pressure chamber 103 at the opposite side of the diaphragm 101 will create a sufficient differential in pressure on opposite sides of said diaphragm to deflect same against opposition of the spring 111 and will move the slide valve 100 to its quick service position, whereupon said brake pipe pressure chamber 102 becomes open to the quick service volume 15 by way of the port 106 and groove 105 in the valve 100, and passage 107.

Upon establishment of the connection between the brake pipe pressure chamber 102 in the quick service valve device 8 and the passage 107 as above mentioned, fluid under pressure will flow from the former by way of the latter to the respective quick service volume 15, and, via passage 96, to the groove 95 in the slide valve 91 of the inshot valve device 7, and thence via passage 94 to the control chamber 114 in the charging valve device 9. As a consequence, brake pipe pressure as experienced in the brake pipe pressure chamber 102 in the quick service valve device 8 will promptly equalize into the quick service volume chamber 15 and into the control chamber 114 in the charging valve device 9. Such pressure of fluid in the control chamber 114 in the charging valve device 9 acting on diaphragm 113 will cause sufficient force to act thereon in opposition to action of spring 119 to move said diaphragm or deflect same in the direction of said spring and to carry slide valve 117 to its lap position in which the reservoir charging passage 122 is cut off from the control reservoir passage 67 via the groove 121 and the auxiliary reservoir charging passage 123 is cut off from the auxiliary reservoir passage 55 via the chamber 124. In this cut-off or lap position of the slide valve 117, it will be appreciated that the auxiliary reservoir 3 and the control reservoir 16 are both cut off from the brake pipe 2.

By virtue of the connection established between the brake pipe 2 and the quick service volume 15 during operation of the quick service valve device 8 to move its slide valve 100 to its quick service position as above described, fluid under pressure from the brake pipe will flow by way of passage 62, chamber 102, port 106, and groove 105 into the passage 107, and thence to the quick service volume chamber 15 as above mentioned. As a result of such flow, a fast local reduction in pressure in the brake pipe on that particular car will be experienced which will hasten reduction in pressure in the brake pipe on the next car of the train, which reduced pressure in the brake pipe on the next car, if such car is equipped with the subject brake apparatus, will be sufficient to cause operation of the quick service valve device 8 on that car to effect a similar local reduction in brake pipe pressure thereon and so on serially back through the train from car to car.

However, at the same time, brake pipe fluid thus admitted to the respective quick service volume chamber 15 will escape to the atmosphere at a controlled rate by way of the passage 96, the groove 95 in slide valve 91 of the brake cylinder inshot valve device 7, the passage 94, the choke 160 and the brake cylinder passage 36 vented to the atmosphere via chamber 20, the passage 24 and groove 26 in the slide valve 22 of the service valve device 6, the passage 27, and the choke 28. Such flow of fluid from the quick service volume chamber 15 to the atmosphere, affords a continued local venting of the brake pipe fluid on a respective car employing the brake equipment which assures that a reduction in brake pipe pressure will be realized in a plurality of succeeding cars on which there may be no brake equipment, sufficient to cause operation of the quick service valve device 8 on the subsequent cars so equipped.

It should be pointed out that since in Europe brake controlling valve devices do not have to distinguish between different service and emergency rates of reduction in brake pipe pressure, as they do in the United States, the quick service reduction in brake pipe pressure effective by operation of the quick service valve device 8 may be as rapid as desired, which, in conjunction with the very low differential in fluid pressure required to operate such quick service valve device, permits any desired rate of serial operation of the quick service valve devices in the various cars of a train.

When the pressure of fluid in the brake pipe 2 is reduced by operation of the quick service valve device 8, as just described, a corresponding reduction in pressure will occur in the brake pipe pressure chamber 52 in the service valve device 6, and when the pressure in said chamber thus becomes sufficiently reduced, the bottled up control reservoir pressure in the control reservoir pressure chamber 53 in said device 6 will move the diaphragm stack upwardly, as viewed in the drawing, against the reduced brake pipe pressure in chamber 52 and against the force of the bias spring 44 in the brake cylinder pressure chamber 33.

It is intended that the diaphragms 48 and 29 move upwardly as just described when brake pipe pressure in chamber 52 is reduced, for example, two or three pounds below control reservoir pressure in chamber 53. However, if the diaphragm stack does not move upwardly upon such reduction in brake pipe pressure, then by operation of the quick service valve device 8, pressure in the brake pipe 2 and chamber 52 will continue to be reduced relative to control reservoir pressure in chamber 53, by way of the groove 61 and valve 46 in service valve device 6, the passage 62, the brake pipe pressure chamber 102 in quick service valve device 8 as well as the port 106 and groove 105 in said device, the passage 107, the quick service volume chamber 15, the passage 96, the groove 95 in valve 91 of the brake cylinder inshot valve device 7, the passage 94, the choke 160, the brake cylinder pipe 36, chamber 20, the passage 24 and groove 26 in the valve 22 of said service valve device, the passage 27 and choke 28, until a sufficient differential between such opposing pressures on the diaphragm stack in the service valve device 6 obtains to ensure the desired movement. It will thus be evident that the positive local quick service venting of fluid under pressure from the brake pipe by operation of the quick service valve device 8 will ensure movement of the respective diaphragm stack on the brake-equipped car even if located on the train to the rear of a bunch of two or more non-brake-equipped cars, or cars provided with brake equipment which is not operating.

Since the quick service valve device 8 merely functions to establish communication between the brake pipe 2 and the quick service volume chamber 15, the slide valve 100 may be relatively small, so that said device 8 may be designed to dependably operate on a very slight reduction in brake pipe pressure, such as previously mentioned, to ensure transmission of a sufficient quick service reduction in brake pipe pressure through a train as will cause prompt operation of all the quick service valve devices on the train, and to positively ensure movement of each respective multiple diaphragm service valve device 6 out of its respective brake release position in which it is shown in the drawing, to an application position previously defined, even if said service valve device 6 is sluggish for any reason, in its response to a reducing brake pipe pressure.

When the diaphragm stack of the service valve device 6 thus moves upwardly in response to a reduction in brake pipe pressure in chamber 52, to move from its release position in which it is shown in the drawing to its previously defined application position, upward movement of the valve 46, through the medium of stem 45, will cause upward movement of the release valve seat element 22 to first engage its seat 25 with the release valve 16a, thereby closing off communication between the brake cylinder device 4 and the atmosphere by way of the chamber 20 and opening 24 in the device 6, and, thereafter, continued upward movement of the valve 46 will cause its groove 54 to be brought into registry with the upper and lower ports of the brake cylinder passage 36 in addition to registry with the auxiliary reservoir passage 55. Upon establishment of registry of the groove 54 with passage 36 as above described, fluid under pressure from the auxiliary reservoir 3 will flow to the brake cylinder device 4 by way of the pipe and passage 55, said groove 54, both ports of the broke cylinder passage 36, said passage 36, the chamber 37 in the brake cylinder inshot valve device 7, and therefrom by way of the passage 38 as well as the passage 97, via unseated valve 68, opening 72 and chamber 71, into the header chamber 40 thence via passage 41 and pipe 42 to said brake cylinder device; flow to chamber 40 via passage 38 being at a controlled rate by way of the choke 39, while flow to said chamber via passage 97 occurs at a more rapid rate without restriction. Such rapid flow to the brake cylinder device at this time by way of both chambers 37 and 71 in the brake cylinder inshot valve device 7 allows the brake cylinder device to become pressurized sufficiently to take up the slack in the brake rigging of the vehicle and advance the brake shoe into an engagement with the wheel in a minimum possible time.

When the pressure of fluid in the brake cylinder device 4, as supplied thereto as above described, attains a value such as six pounds, for example, corresponding to attainment of the brake shoe into engagement with the wheel without any material application of force exerted by the shoe on the wheel, such brake cylinder pressure as experienced within the brake cylinder inshot valve device chamber 77 via passage 98 and choke 99 within the confines of the seat 84, in acting on the valve 79 will cause its unseating and opening of chamber 77 to chamber 83. Such brake cylinder inshot valve device 7 thereupon will assume its previously defined normal brake cylinder supply position in which the valve 68 is seated and closes off the chamber 37 from the chamber 71 and the port and passage 92 in the slide valve 91 in said device 7 is in registry with the passage 94, while groove 95 is out of registry with said passage.

Upon closure of the valve 68 in the brake cylinder inshot device 7 as above, supply of fluid under pressure from the auxiliary reservoir 3 to the brake cylinder device 4 by way of the service valve device 6 and the passage 36 as previously described, will occur exclusively by way of the chamber 37, the passage 38, the choke 39, header chamber 40, passage 41, and pipe 42; the choke 39 acting to so control the rate of admission of fluid under pressure to the brake cylinder device 4 that the resultant increase in degree of brake application will occur at a controlled rate commensurate with the desired smoothness in operation of the vehicle being decelerated.

At the same time disestablishment of registry of the groove 95 of the valve 91 with the passage 94 bottles up the fluid under pressure in the quick service volume chamber 15, while registry of the port end of passage 92 in said valve 91 with said passage 94 permits fluid under pressure from the brake cylinder pressure chamber 77 to flow by way of the unseated valve 79, into and through the chamber 83, thence into and through the passage 92 to the control chamber 114 in the charging valve device 9 by way of the passage 94 to maintain said chamber pressurized during a brake application when the brake cylinder device 4 is pressurized. At such time, the pressure of fluid at opposite sides of the choke 160 will be substantially equal and no flow will occur therethrough.

On any particular car, as fluid under pressure is supplied to the brake cylinder device 4 as above described, the pressure of such brake cylinder fluid will be realized in the brake cylinder pressure chamber 33 in the service valve device 6 to act, in assist to the brake pipe pressure in chamber 52, and in opposition to the control reservoir pressure in chamber 53, on the diaphragm stack. Assuming that the reduction in brake pipe pressure effected by operation of the engineer's brake valve is limited to a chosen degree, then when the pressure obtained in the brake cylinder device 4 and as realized in chamber 33 in the service valve device 6 is increased to a chosen value related to the degree of brake pipe reduction in chamber 52, such increasing brake cylinder pressure acting in chamber 33, as assisted by the reduced brake pipe pressure in 52, will move the diaphragm stack and the release valve seat element 22 in the direction of said control reservoir pressure chamber 53 to the previously defined lap position of the piston valve 46, while the release valve 16a remains seated.

In such lap position of the piston valve 46 in service valve device 6, the groove 54 of said valve will be out of registry with either port of the brake cylinder passage 36, and since at this time the release valve 16a is closed, it will be appreciated that whatever pressure as realized in the brake cylinder device 4 by virtue of operation of the service valve device 6 will be held therein. At such time, the diaphragm will be in balance and a particular brake cylinder pressure as realized in chamber 33 in the service valve device 6 will be commensurate with the reduced brake pipe pressure in chamber 52 in opposition with the control reservoir pressure in chamber 53. According to the design of the service valve device 6, the differential in areas between the diaphragm 29 and the diaphragm 48 is such that a certain reduction in brake pipe pressure in chamber 52 requires two and one-half pounds of brake cylinder pressure to be established in chamber 33 to every pound of such brake pipe reduction below the control reservoir pressure in chamber 53 in order to cause the diaphragm stack to assume the position in which the valve 46 closes off the brake cylinder passage 36 from the auxiliary reservoir passage 55 while release valve 16a remains closed to prevent release of fluid under pressure from said brake cylinder device.

At the same time that the service valve device 6 is caused to assume its lap position to maintain the desired pressure of fluid in the brake cylinder device 4, as above described, the reservoir charging groove 59 is brought into registry with the reservoir charging passage 60, whereupon, fluid under pressure from the brake pipe will flow by way of the passage 62, the groove 61 in valve 46, the brake pipe pressure chamber 52, the port 58, opening 57, and said groove 59, via said passage 60 to the auxiliary reservoir 3 by way of the auxiliary reservoir charging check valve device 14, if such reservoir pressure be depleted to the extent that same is more than one and seven-tenths pounds less than the brake pipe pressure existent in chamber 52. Otherwise, if the brake pipe pressure as existent in the brake pipe chamber 52 in the service valve device 6 is not greater than the pressure of fluid in the auxiliary reservoir 3 at the time that the service valve device 6 assumes its lap position as above described, such brake pipe pressure in the passage 60 will be insufficient to cause unseating of the check valve 154 in the device 14 against the opposition of the spring 155. Such recharging of the auxiliary reservoir 3 will occur under the above circumstances at any time that the service valve device 6 assumes its lap position.

If the engineer on the locomotive desires to increase the degree of brake application, he will effect a further reduction in pressure in the brake pipe 2 throughout the train according to the increase in brake application desired. Upon the consequent reduction in pressure in the brake pipe 2 on the particular car, such reduction will be experienced in the brake pipe pressure chamber 52 in the service valve device 6 to establish unbalance of pressure forces acting on its diaphragm stack in favor of preponderance in control reservoir pressure in chamber 53, which unbalance will result in movement of the stack in the direction of chamber 52, thereby carrying the slide valve 46 out of its lap position to its application position in which the brake cylinder supply groove 54 is again opened to the brake cylinder passage 36 to allow for admittance of fluid under pressure from the auxiliary reservoir 3 to the brake cylinder device 4, as previously described in detail. Again in response to pressurization of the brake cylinder pressure chamber 33 in the service valve device 6 in degree according to degree of reduction in brake pipe pressure as experienced in chamber 52, the diaphragm stack of said device 6 will move in the direction of the control reservoir pressure chamber 53 to carry the slide valve 46 to its lap position as before, to hold the particular desired pressure in the brake cylinder device 2 in accord with the reduced brake pipe pressure in chamber 52. By reducing the brake pipe pressure in such increments as desired, proportional increases in pressure may be provided in the brake cylinder device 4 to create any selected degree of braking, or if desired, the brake pipe pressure may be reduced in a single continuous stage, which continuous reduction will result in a proportional continuous build-up in degree of brake application.

During operation of the service valve device 6 to effect increase in the degree of brake application as above described, when, as a result of the valve 46 having been moved to its application position, the brake cylinder pressure attains the same value as the pressure existent in the auxiliary reservoir 3, subsequent reductions or over-reductions in brake pipe pressure in the chamber 52 will result in maintaining the diaphragm stack positioned to hold the valve 46 in its application position, but no further increase in brake cylinder pressure will be realized in chamber 33, so that the diaphragm stack will remain in application position for the duration of such over-reduction in brake pipe pressure.

From the above description it will be clear that an application of brakes may be graduated on in any desired steps or may be made in a continuous step if desired. It will also be noted that closing of the valve 68 in the brake cylinder inshot valve device 7 during an application of the brakes will reduce the rate of supply of fluid under pressure to the respective brake cylinder device 4 according to the flow capacity of the choke 39. The valve 69 of the inshot valve device 7 closes at a pressure in the brake cylinder device 4 which is just sufficient to cause the brake cylinder piston to assume its application position, but not sufficient to produce effective braking, in order to prevent damaging run-in of slack in a train. Choke 39, then brought into play, governs the rate of effective brake application increase and will provide a sufficiently uniform rate of increase in degree of brake application as will decelerate a train and bring it to a stop without objectionable shock.

While the service valve device 6 is in its lap position, if there should be leakage of fluid under pressure from the respective brake cylinder device 4 so that such brake cylinder pressure is reduced below that called for by virtue of the brake pipe pressure existent in the brake pipe pressure chamber 52 in said device 6, such reduction in brake cylinder pressure as experienced in the brake cylinder pressure chamber 33 in device 6 will allow the pressure of fluid in the control reservoir pressure chamber 53 to move the diaphragm stack gradually upward to cause the valve 46 to assume its brake cylinder maintaining position in which the lowermost port 36a of the brake cylinder passage 36 is opened to groove 54 and auxiliary reservoir fluid is thereby permitted to flow from passage 55 into passage 36 by way of the groove 54 and thence to the brake cylinder device by way of the chamber 37 in the inshot valve device 7, the passage 38, the choke 39, header chamber 40, passage 41 and the pipe 42, to make up for such reduction in brake cylinder pressure and to maintain same in accord with the degree of reduction of brake pipe pressure. Subsequently, re-establishment of the proper brake cylinder pressure in chamber 33 in accord with the existent brake pipe pressure in chamber 52 will allow the former pressure to move the diaphragm stack and slide valve 46 back to lap position as previously described.

If, during a brake application, leakage of fluid under pressure from the brake cylinder device occurs at a rate such that the pressure of fluid in the auxiliary reservoir tends to become depleted as the result of automatic make-up in brake cylinder pressure by operation of the service valve device 6 as above described, such depletion in auxiliary reservoir pressure will be made up or otherwise offset by supply of fluid under pressure from the brake pipe by way of the brake pipe pressure chamber 52 in said device 6, the port 58, passage 57, and groove 59, in the valve 46 of device 6, the reservoir charging passage 60, and the check valve 154 in the auxiliary reservoir charging check valve device 14 and the passage and pipe 55. Such maintenance of the auxiliary reservoir pressure by way of check valve device 14 will avail the auxiliary reservoir pressure to within such as one and seven-tenths pounds of the brake pipe pressure existent in the chamber 52 in device 6, according to the value of the spring 155 in said device 14. Such make-up of fluid under pressure to the auxiliary reservoir 3 from the brake pipe 2 during the existence of a moderate degree of brake cylinder leakage maintenance, will occur at any time that the auxiliary reservoir pressure as experienced at the output side of the check valve 154 in device 14 is below the one and seven-tenths pounds value less than the brake pipe pressure existent in the brake pipe pressure chamber 52 in the device 6 at the input side of said check valve device.

If at the time that the service valve device 6 is in its brake cylinder maintaining position, the leakage of fluid under pressure from the brake cylinder device 4 is excessive, so that the brake cylinder pressure as realized in the brake cylinder pressure chamber 33 in service valve device 6 is reducing at a rate greater than can be made up by the brake cylinder maintaining choke, i. e., the lowermost port 36a of the brake cylinder passage 36, from the auxiliary reservoir by way of the groove 54 in the slide valve 46 of said service valve device, then the diaphragm stack will be caused to assume its previously defined application position in which the groove 54 is brought into registry also with the uppermost port of said brake cylinder passage 36 to allow for supply of fluid under pressure from the auxiliary reservoir 3 to the brake cylinder device by way of the passage 36 at a greater rate in effort to compensate for the excessive rate of leakage from said brake cylinder device. If during such brake cylinder maintaining flow from the auxiliary reservoir 3 to the brake cylinder device by way of the groove 54 in the slide valve 46 in its application position by way of both the upper and lower ports of the passage 36, such flow is able to compensate for the excessive rate of flow of leakage from the brake cylinder device, then the resultant increase in brake cylinder pressure as realized in the chamber 33 will return the slide valve 46 of the service valve device 6 to either its brake cylinder maintaining position or to its lap position according to the rate and degree of increase in pressure in said chamber 33. However, if during brake cylinder maintaining flow of fluid under pressure from the auxiliary reservoir 3 to the brake cylinder passage 36 both by way of the upper and lower ports of said passage in the slide valve 46 of valve device 6 in its application position, such flow is inadequate to restore the loss of brake cylinder fluid during the excessive leakage of such fluid in discussion, then the slide valve 46 will remain in its application position in which the recharge communication from the brake pipe 2 to the auxiliary reservoir 3 via passageway 60 and check valve device 14 is cut off at the slide valve 46 to prevent undesired bleed-down of brake pipe pressure to the atmosphere at the leaking brake cylinder device for the duration of a given brake application and until the pressure of fluid in the brake pipe pressure chamber 52 has been restored to its full normal charge. Under influence of brake pipe pressure at full charge value, such brake pipe pressure in chamber 52 will be sufficient to return the slide valve 46 to its release position in which it is shown in the drawing without the aid of brake cylinder pressure in chamber 33 which will be reduced to substantially atmospheric pressure under the assumed excessive leakage conditions. Only then will the auxiliary reservoir 3 be recharged with fluid under pressure from the brake pipe by way of the valve 46 in service valve device 6 and the reservoir supply passage 60, as previously described.

If during a brake application, leakage of fluid under pressure from the brake cylinder occurs at a normal rate such that the pressure of fluid in the auxiliary reservoir 3 tends to become depleted as a result of automatic normal make-up in brake cylinder pressure by operation of the service valve device 6 as above described, such depletion in auxiliary reservoir pressure will be made up or otherwise offset by supply of fluid under pressure from the brake pipe by way of the brake pipe passage 62, chamber 52 in the service valve device 6, when in its brake cylinder maintaining position, the port 58, opening 57 and groove 59 in said valve 46, the reservoir charging passage 60, and the spring-loaded check valve 154 in the auxiliary reservoir charging check valve device 14, as well as the passage and pipe 55. Such maintaining flow of fluid under pressure to the auxiliary reservoir by way of the check valve device 14 will avail the auxiliary reservoir pressure to within such as one and seven-tenths pounds of brake pipe pressure existent in the chamber 52 in the service valve device 6, according to the value of the spring 155 in said device 14.

Such make-up of fluid under pressure to the auxiliary reservoir 3 from the brake pipe 2 during the existence of a moderate degree of brake cylinder leakage maintenance, will occur at any time that the auxiliary reservoir pressure as experienced at the output side of the check valve device 14 drops below one and seven-tenths pounds, for example, that brake pipe pressure existent in the brake pipe pressure chamber 52 in the service valve device 6 at the input side of said check valve device. At that time, the preponderance in the pressure in passage 60 at the input side of the check valve 154 in device 14 will be sufficient to overcome the action of the spring 155 on check valve 154 to allow for such auxiliary reservoir make-up from the brake pipe via the service valve device 6.

Except in the case of depletion due to maintaining brake cylinder pressure against leakage, the pressure of fluid in the auxiliary reservoir 3 and thereby diaphragm chamber 103 in the quick service valve device 8 will always exceed that in the brake pipe pressure chamber 102 in said device 6 by a degree sufficient to hold the components of said device in their quick service position while the brake application is in effect. In case of depletion in auxiliary reservoir pressure down to or below that in the brake pipe 2, the spring 111 in the quick service valve device 8 will, however, return the components of the quick service valve device 8 to their normal positions in which they are shown in the drawing and in which position the slide valve 100 laps off the quick service volume supply passage 107 from the brake pipe pressure chamber 102; such act, however, will have no effect on the remaining portion of the equipment at such time.

*Release of brake application*

To effect release of a brake application and to effect recharge of the equipment with fluid under pressure, fluid under pressure will be supplied to the brake pipe 2, thence via the passage 62 to the brake cylinder pressure chamber 52 in the service valve device 6 by way of the groove 61 in the slide valve 46, which groove 61 will be in registry with the respective open end of the respective branch of the brake pipe passage 62 when the service valve device 6 is in its lap or application position.

When the pressure of fluid in the brake pipe pressure chamber 52 in the service valve device 6 is thus increased sufficinetly, such pressure, acting in conjunction with the bias spring 44 in the brake cylinder pressure chamber 33, and with the brake cylinder pressure existent in said chamber 33, will create a sufficient force on the diaphragm stack acting in opposition to the force created by the control reservoir pressure acting in chamber 53 on said stack, to move the diaphragm stack downwardly, as viewed in the drawing, to its release position in which it is shown in the drawing, defined by engagement of follower member 50 with the spring biased movable stop element 64 as previously defined.

Upon thus being caused to assume its release position, fluid under pressure from the brake cylinder device 4 will release to the atmosphere by way of the pipe 42, the passage 41, the header chamber 40, the choke 39, the brake cylinder passage 38, the chamber 37 in the brake cylinder inshot valve device 7, brake cylinder passage 36, the chamber 20 in service valve device 6, the unseated release valve 16a, the passage 24 and groove 26 in the valve 22 of service valve device 6, the passage 27, and the choke 28 to the atmosphere. The pressure of fluid in the brake cylinder device 4 will thus be caused to reduce.

At the same time, upon an increase in pressure of brake pipe fluid in the brake pipe pressure chamber 52 in the service valve device 6 to effect such release of the brakes or the reduction in degree of brake application, as above described, if such increase in pressure of brake pipe fluid in chamber 52 results in preponderance of pressure via passage 60 at the input side of the auxiliary reservoir charging check valve device 14 to the extent of more than one and seven-tenths pounds as hereinbefore described, such fluid under pressure will flow from the passage 60 via said device 14 to the auxiliary reservoir 3 to cause pressurization of same to the extent of one and seven-tenths pounds of brake pipe pressure in chamber 52 in the service valve device 6, as will be understood from the preceding description.

During the release of fluid under pressure from the brake cylinder device 4 by way of the choke 39 and the associated passage 38 and the choke 28 associated with the passage 27, such release will occur at a controlled rate by virtue of these chokes, so that the reduction in brake cylinder pressure and hence the release of the brakes will occur at a controlled rate to assure smooth operation of the train. Such pressure as realized in the brake cylinder pressure chamber 33 in the service valve device 6 will also govern the rate of admission of fluid under pressure from the brake pipe 62 into the brake pipe pressure chamber 52 by automatic adjustment in position of the slide valve 46 including its groove 61 to thereby regulate the rate of recharge of the auxiliary reservoir 3 from said chamber 52.

Such reduction in brake cylinder pressure as effected by release of fluid under pressure from brake cylinder device 4 at a controlled rate by way of the service valve device 6 in its release position as above described, will result in a gradual reduction in brake cylinder pressure in proportion to the restoration of brake pipe pressure as realized in the brake pipe chamber 52 in said device 6. Such reduction in brake cylinder pressure will be realized also in the brake cylinder pressure chamber 33 of device 6. If the restoration of brake pipe pressure is limited to a degree lower than normal brake pipe pressure, such reduction in the brake cylinder pressure chamber 33 will result in the gradual unbalancing of the diaphragm stack of device 6 in favor of preponderance of pressure of control reservoir fluid in the chamber 53 which will cause movement of the diaphragm stack in the direction of the chamber 33 to cause the release valve seat element 22 to re-engage the release valve 16a and close off the chamber 20 from the passage 24 and said element 22, thereby causing the service valve device 6 to assume its lap position as previously defined and terminating further release of fluid under pressure from the brake cylinder device 4.

At the time that the respective service valve device 6 responds to the reduction in brake cylinder pressure as experienced in its brake cylinder pressure chamber 33 and assumes its lap position, the brake cylinder pressure thereby established, due to the differential in areas between the diaphragms 29 and 48 as previously mentioned in regard to application of the brakes, will be proportional to the prevailing brake pipe pressure existing in the chamber 52 according to the ratio of two and one-half to one, that is, every pound of increase in brake pipe pressure in chamber 52 over that previously existing during a particular degree of brake application, will call for a two and one-half pound reduction in brake cylinder pressure in the brake cylinder pressure chamber 33 to effect movement of the diaphragm stack back to its lap position.

It should be pointed out that on any particular car employing a subject brake equipment, should the rate of increase in the brake pipe pressure tend to become excessive, such as on cars adjacent to the locomotive, such tendency will be realized by a corresponding tendency to overpressurization of the brake pipe pressure chamber 52 in the respective service valve device 6. The diaphragm stack of the service valve device 6 will respond to such tendency to move in the direction of the control reservoir pressure chamber 53 against opposition of the spring biased stop element 64 thereby carried away from the fixed stop element 66 and will cause such stack to assume its retarded recharge position previously defined in which the uppermost end of the groove 61 of valve 46 is so positioned relative to the port end of brake pipe passage 62 as will restrict admittance of brake pipe fluid from the passage 62 into the brake pipe pressure chamber 52 to maintain a balance between the rate at which the pressure of fluid in the brake pipe pressure chamber 52 will increase relative to the resultant controlled rate of decrease in the brake cylinder pressure chamber 33. Such control of rate of increase in pressure of fluid in the brake pipe pressure chamber 52 in the service valve device 6 by automatic adjustment of position of the valve 46 as just described, in turn regulates the rate of admission of supply of fluid under pressure from the chamber 52 to the auxiliary reservoir 3 by way of the check valve device 14, on such cars adjacent to the locomotive, by virtue of the control in admittance of fluid to the brake pipe pressure chamber 52 in service valve device 6. Fluid thus will not be utilized from the brake pipe on such cars for recharging the auxiliary reservoir at a rate which would unduly delay propagation of the brake pipe pressurization back through the train. It is thus assured that the succeeding service valve device 6 thereon will be promptly brought into operation to effect a release of the respective brakes on such cars as well as in effecting recharge of the respective auxiliary reservoirs thereon.

Under the circumstances where, on any particular car, the pressure of fluid in the brake pipe 2 is increased to a value in excess of control reservoir pressure in the chamber 53 in the respective service valve device 6, and such excessive brake pipe pressure persists for sufficient length of time to allow the brake cylinder pressure to be reduced to atmospheric pressure by way of the release valve seat element 22 in said device 6, when the balance of the diaphragm stack, as determined by the degree of pressure in the chamber 52 and in the control reservoir pressure chamber 53, is restored, the stack will eventually assume a position in which the slide valve 46 is so disposed relative to the casing that its groove 61 is out of registry with the port end of the brake pipe passage 64 to prevent overpressurization of the brake pipe pressure chamber 52 to any extent beyond seven-tenths of a pound above the control reservoir pressure existent in the chamber 53, as determined by the value of the spring 63. The diaphragm stack in the respective graduating control device 6 will remain in such retarded recharge position against opposition of the spring 63, with the brake cylinder pressure reduced to atmospheric pressure and the auxiliary reservoir 3 charged to within one and seven-tenths pounds of the pressure existent in chamber 52 so long as the excessive overpressurization of the brake pipe on that particular car persists. In the manner as described in the preceding paragraphs, the pressure of fluid in the brake cylinder device 4 may be graduated off in such steps as desired by proper step increases in pressure of fluid in the brake pipe 2, or increase in pressure in brake pipe 2 may be continuously uninterrupted. When the pressure in the brake pipe 2 and thereby in diaphragm chamber 52 of service valve device 6 finally becomes increased to within two or three pounds of the value of the normal pressure carried in the brake pipe, and which pressure is effective in the control reservoir 16 and acting in the control reservoir pressure chamber 53 in the service valve device 6, the balance thereby established on the diaphragm stack will hold such stack in its release position in which it is shown in the drawing and as previously described. As the pressure in the brake cylinder device 4 and chamber 33 is finally reduced to atmospheric pressure, the recharging of the auxiliary reservoir 3 to within one and seven-tenths pounds of the pressure in the brake pipe by way of the auxiliary reservoir charging check device 14 will occur.

When the pressure of fluid in the brake cylinder device 4 during release of the brakes as above described becomes reduced to substantially an ineffective value, such as six pounds, the force of the spring 90 in the brake cylinder inshot valve device 7 will move the diaphragm assemblage out of its normal brake cylinder supply position, previously defined, in the direction of chamber 37 to cause unseating of the valve 68 from its seat 70, while at the same time reseating the valve 79 and causing the slide valve 91 to move to its uppermost position in which it is shown in the drawing re-establishing communication via groove 95 between the passages 94 and 96. Unseating of the valve 68 will allow fluid under pressure from the brake cylinder device 4 to release at a more rapid rate than when said valve was seated, by way of the chokes 39 and passage 38 as well as the passage 97 and both the chambers 37 and 71 in said brake cylinder inshot valve device. At the same time, fluid under pressure from the quick service volume chamber 15 will flow by way of the passage 96, groove 95 and valve 91 of brake cylinder inshot valve device 7, and the passage 94 to the chamber 114 in the charging valve device 9 to maintain such chamber pressurized to the extent as will hold said charging valve in its cut-off position while the brake cylinder pressure reduces to atmospheric pressure by release of fluid under pressure from the brake cylinder device 4. This holding of the charging valve device 7 in its cut-off position by admittance of fluid under pressure from the quick service volume chamber 15 at such time that the brake application is substantially fully released, prevents undesirable initiation of a quick service reduction in brake pipe pressure which would result in a shock producing application, if, while releasing, the operator should suddenly vent the brake pipe to effect a reapplication of the brakes and the quick service valve device 8 responded to assume its quick service position connecting the quick service volume chamber 15 to the brake pipe responsively to the reduction in brake pipe pressure intended to effect a reapplication of the brakes at that time. Under such circumstances where a reapplication would be called for, according to the present arrangement, the quick service volume chamber 15 being still charged with fluid under pressure prior to operation of the brake cylinder inshot valve device 7 as above described will prevent quick service venting of fluid under pressure from the brake pipe.

During release of the brakes, subsequent to operation of the brake cylinder inshot valve device 7 to its uppermost position, as above described, in response to reduction in brake cylinder pressure to six pounds, when the brake cylinder pressure as realized in the chamber 114 in the charging valve device 9 further reduces by way of the passage 94, the choke 160 and the brake cylinder passage 36, said device will be caused to assume its charging position by action of the spring 119 in which the slide valve 117 will again be in position to establish communication between the auxiliary reservoir charging passage 123 and chamber 124, and the groove 121 in valve 117 will be in position as shown in the drawing to connect the control reservoir passage 67 to the control reservoir charging passage 122.

At such time that the charging valve device 9 assumes its charging position as above described, fluid under pressure from the brake pipe pressure chamber 52 in the graduating control device 6 will then flow at a restricted rate by way of the brake pipe, the reservoir charging passage 60, the choke 153, the chamber 150 in the auxiliary reservoir overcharge check valve device 13, the passage 123, the chamber 124 in charging valve device 9, and the passage and pipe 55 to the auxiliary reservoir 3 to charge same from its previous value of one and seven-tenths pounds less than the normal value to its full normal value of seventy-one pounds in approximately twenty seconds.

According to a feature of the invention, it will be noted that when the charging valve device 9 is caused to assume its charging position as above described, the control and auxiliary reservoirs remain isolated one from the other, while the charging cut-off valve device 10 will remain in its cut-off position by virtue of the substantially normal value of the control reservoir pressure existent at time of release of the brakes, so that at the time the charging valve device 9 assumes its charging position, the control reservoir will not equalize with the auxiliary reservoir which may be several pounds less than control reservoir pressure at that time. Rather, the control reservoir 16 will equalize with the pressure of fluid in the brake pipe pressure chamber 52 in the service valve device 6 by way of the pipe and passage 67, the groove 121 in valve 117 of such charging valve device 9, the passage 122, the chamber 133 in valve device 10, the passage 135, the chamber 143 in check valve device 12, the choke 145 and the choke 144, said reservoir charging passage 60, the groove 59, opening 57 and port 58 in the slide valve 46 of the service valve device 6, and then to the brake pipe pressure chamber 52. Due to delay of opening of the charging valve device 9 by dumping fluid under pressure from the quick service volume chamber 15 into the chamber 114 of such charging valve device at a time when the brake cylinder pressure is substantially fully released, the pressure of fluid in the brake pipe passage 62 and hence in the brake pipe pressure chamber 52 in the service valve device 6 will be substantially at its normal charge value. Hence, when such charging valve device 9 moves to its charging position to connect the control reservoir 16 to the brake pipe pressure chamber 52 in service valve device 6 by way of the reservoir charging passage 60, the resultant equalization of the control reservoir into the chamber 52 will result in very little if any loss in pressure of fluid in the control reservoir 16 and hence in the control reservoir pressure chamber 53 in the service valve device 6 at such time. At the same time, the charging cut-off valve device 10 can prevent any rapid escape of fluid under pressure from the control reservoir to the brake pipe 2 by way of the passages 62 and 134, and the chokes 144 and 145 associated with the control reservoir overcharge check valve device 11 will prevent rapid escape of fluid under pressure from the control reservoir 16 to the reservoir charging passage 60 should the brake pipe pressure of fluid in said passage 60 be such as would encourage any loss of control reservoir fluid.

Thus the pressurization of the control reservoir 16 is assured at a time of brake release, so that subsequently upon initiation of a brake application such control reservoir pressure as existent in the chamber 53 in the service valve device 6 may be relied upon to effect the desired degree of brake application as called for by a reduction in brake pipe pressure in chamber 52 as aforedescribed. If, however, at the time that the control reservoir 16 becomes connected to the reservoir charging passage 60 upon the charging valve device 9 assuming its charging position, the control reservoir pressure is less than the pressure of fluid existing in the brake pipe pressure chamber 52 in service valve device 6, as caused by leakage of fluid under pressure from the control reservoir, for example, the full normal control reservoir pressure will be restored by flow of fluid under pressure from the brake pipe pressure chamber 52 to the control reservoir 16 and hence to chamber 53 in service valve device 6 by way of said chamber 52, the port 58, opening 57 and groove 59 in valve 46, said passage 60, the choke 145 associated with the control reservoir overcharge check valve device 12, the passage 135, the chamber 133 in the charging cut-off valve device 10, the passage 122, the groove 121 in the valve 117 of charging valve device 9, and the passage and pipe 67.

It will be appreciated that subsequent to initial charging of the particular brake equipment, the charging cut-off valve device 10 will remain in its previously defined cut-off position opposite to that in which it is shown in the drawing so long as the pressure of fluid in the control reservoir 16 remains above such as sixty-five pounds, a pressure within six pounds of its normal value. Should the control reservoir pressure reduce below sixty-five pounds, as by virtue of such as excessive leakage of fluid under pressure from said control reservoir, the charging cut-off valve device 10 will assume its uppermost position to allow for recharge of the control reservoir at a more rapid rate by way also of the passage 134, choke 140, the control reservoir charging check valve 137 in device 11, and the brake pipe passage 62 in manner as previously described.

As previously described in connection with initial charging of the equipment, at the time that the charging valve device 9 responds to return to its charging position as above described, should the control reservoir 16 tend to become overcharged from an overcharged brake pipe by way of the choke 145 in check valve device 12, upon reestablishing the normal brake pipe pressure, such overcharge of the control reservoir 16 will be rapidly dissipated by way of the combined capacity of the choke 145 as well as the choke 144 automatically brought in to play by virtue of the arrangement of the check valve 142, and the brake pipe pressure chamber 52 in the service valve device 6.

Correspondingly, as previously described in connection with initial charging of the auxiliary reservoir 3, at the time that the charging control valve device 9 responds to return to its charging position as above described, should said auxiliary reservoir tend to become overcharged from an overcharged brake pipe by way of the limiting choke 153, passage 123, and the chamber 124 in device 9, such overcharge of the auxiliary reservoir will be rapidly dissipated by way of the combined capacities of the choke 153 as well as the choke 152 by virtue of the arrangement of the check valve 147 in device 13 so that overcharge in the auxiliary reservoir 3 will not persist for any material length of time.

It should also be pointed out, that since the auxiliary reservoir 3 and the control reservoir 16 are charged by way of the reservoir passage 60 and since the reservoir passage 60 is charged from the brake pipe passage 62 by way of the pressure chamber 52 in the service valve device 6, the rate of increase in pressure of fluid in the control reservoir chamber 53 determines the rate of increase in pressure in said chamber 52 by virtue of the automatic adjustment of the slide valve 46 to prevent entrance of overcharge from the brake pipe passage 62 into said chamber 52, and since the choke 145 associated with the reservoir passage 60 so restricts admittance of fluid under pressure to the control reservoir by way of the charging valve device 9 that the increase in control reservoir pressure as realized in the chamber 53 occurs at a rate which will discourage realization of overpressurization of the brake pipe pressure chamber 52 to any appreciable degree, overcharge of the control and auxiliary reservoirs 16 and 3 by way of the reservoir charging passage 60 is thus discouraged.

SUMMARY

It will now be seen that I have provided a brake apparatus of the graduated release type which provides means for allowing rapid initial charging of the auxiliary and control reservoirs on each equipment throughout a train and which will respond automatically upon approximation of full charge of such reservoirs to subsequently so restrict continued charging of the reservoirs as to discourage entrance of overcharge into the reservoirs as same are charged to their normal value.

In addition, according to the main object of the invention, the subject brake equipment will withstand an overcharging condition in the brake pipe 2 for a longer period of time without overcharging the auxiliary and control reservoirs associated with such equipment than was heretofore possible with similar types of brake equipments. Such object is attained in the present brake equipment, for example, by virtue of the choke 39 associated with the passage 38 whereby a period of such as fifty seconds is required before the brake cylinder pressure corresponding to a full service application value will reduce to a value such as six pounds, the pressure at which the brake cylinder inshot valve device 7 will respond to connect the quick service volume chamber 15 to the control chamber 114 in the charging valve device 9. Thereafter, by virtue of pressurization of the control chamber 114 in the charging valve device 9 with fluid under pressure from the quick service volume chamber 15 and by virtue of the controlled rate of dissipation of such pressurization by release of fluid under pressure from the chamber 114 to the brake cylinder passage 36 via the choke 160, said charging valve device 9 is caused to remain in its cut-off position for an additional period of such as twenty-five seconds before assuming its charging position in which the control and auxiliary reservoirs 16 and 3 are connected to the reservoir charging passage 60. Thereafter, by virtue of the retarded recharge feature of the service valve device 6 whereby the pressure of fluid in the reservoir charging passage 60 is limited to a value no greater than seven-tenths of a pound above the control reservoir pressure in chamber 53 of said valve device 6, which, together with the action of the charge limiting choke 145, so regulates admittance of fluid under pressure from said passage 60 to the control reservoir by way of the charging valve device 9 that several minutes are required to overcharge the control reservoir to even the slight extent of several pounds; the charging cut-off valve device 10 remaining in its lowermost position opposite that in which it is shown in the drawing at such time to prevent facile entrance of such overcharge to the control reservoir by way of the control reservoir charging check valve device 11 and the choke 140. At the same time, upon the charging valve device 9 assuming its charging position, a period of such as an additional twenty-five seconds is required to raise the pressure of fluid in the auxiliary reservoir 3 from a value of such as sixty-nine and three-tenths pounds to which same may be charged via the auxiliary reservoir charging check valve device 14 to its final normal value of seventy-one pounds by way of the choke 153, chamber 150 in device 13, passage 123, and the chamber 124 in the charging valve device 9. Thus it will be seen that in effecting full release of the brakes, the brake pipe may be overcharged for a period of approximately one hundred seconds before the control and auxiliary reservoirs are susceptible of being overcharged, even at the reduced rate determined by chokes 153 and 145.

Having now described the invention, what I claim as new and desire to secure by Letters Patent, is:

1. In a fluid pressure brake equipment, in combination, a brake pipe passageway adapted to be connected to a brake pipe, an auxiliary reservoir for storing brake operating fluid under pressure, a control reservoir for storing fluid at a datum pressure relative to which variations in pressure of fluid in said brake pipe passageway are utilized to control use of fluid under pressure from said auxiliary reservoir during a brake application, a charging passageway, valve means controlling admittance of fluid under pressure from said brake pipe passageway to said charging passageway to limit the pressure of fluid in the latter passageway to a value in slight excess of pressure of fluid in said control reservoir during initial charging of the equipment, auxiliary reservoir charging check valve means permitting flow of fluid under pressure from said charging passageway to said auxiliary reservoir so long as the pressure of fluid in said charging passageway exceeds the pressure of fluid in said auxiliary reservoir by a certain amount, and a restricted communication connecting said auxiliary reservoir with said charging passageway in by-pass of said auxiliary reservoir charging check valve means.

2. In a fluid pressure brake equipment, in combination, a brake pipe passageway adapted to be connected to a brake pipe, an auxiliary reservoir for storing brake operating fluid under pressure, a control reservoir for storing fluid at a datum pressure relative to which variations in pressure of fluid in said brake pipe passageway are utilized to control use of fluid under pressure from said auxiliary reservoir during brake application, a combined auxiliary and control reservoir charging passageway, actuator means responsive to pressure of fluid in said control reservoir and in said auxiliary and control reservoir charging passageway, first valve means operated by said actuator means for controlling admittance of fluid under pressure from said brake pipe passageway to said auxiliary and control reservoir charging passageway to limit the pressure of fluid in the latter passageway to a value in slight excess of pressure of fluid in said control reservoir during initial charging of the equipment, spring-loaded auxiliary reservoir charging check valve means permitting flow of fluid under pressure from said auxiliary and control reservoir charging passageway to said auxiliary reservoir only to the extent of a certain value less than the pressure of fluid in said auxiliary and control reservoir charging passageway, an auxiliary reservoir charging communication connecting said auxiliary reservoir to said auxiliary and control reservoir charging passageway in bypass of said charging check valve means, a first control reservoir charging communication connecting said control reservoir to said brake pipe passageway during beginning of initial charging of the brake equipment, a second control reservoir charging communication connecting said control reservoir with said combined auxiliary and control reservoir charging passageway during initial charging of the equipment, and second valve means responsive to pressure of fluid in said control reservoir to close said first control reservoir charging communication when pressure of fluid in said control reservoir is above a certain value, which value being less than its normal charge value.

3. In a fluid pressure brake equipment, in combination, a brake pipe passageway adapted to be connected to a brake pipe, a control reservoir for storing fluid at a datum pressure relative to which variations in pressure of fluid in said brake pipe passageway are utilized to control the degree of brake application effected by the equipment, a first charging communication for conveying fluid under pressure to said control reservoir during initial charging of the brake equipment, first valve means controlling admittance of fluid under pressure from said brake pipe passageway to said first charging communication to limit the pressure of fluid in said communication to a certain value in excess of pressure of fluid in said control reservoir, a second charging communication connecting said control reservoir to said brake pipe passageway in by-pass of said first valve means during initial charging of the equipment, second valve means responsive to pressure of fluid in said control reservoir to close said second charging communication whenever and so long as the pressure in said control reservoir exceeds a certain value which is less than its datum pressure value, respective flow restricting means in the first and second charging communications, and one-way flow valve means in said second charging communication to permit flow of fluid under pressure from said brake pipe passageway to said control reservoir while preventing flow of fluid under pressure in the reverse direction.

4. In a fluid pressure brake equipment, in combination, a brake pipe passageway adapted to be connected to a brake pipe, an auxiliary reservoir for storing brake operating fluid under pressure, a control reservoir for storing fluid at a datum pressure relative to which variations in pressure of fluid in said brake pipe passageway are utilized to control use of fluid under pressure from said auxiliary reservoir during a brake application, a charging passageway, valve means controlling admittance of fluid under pressure from said brake pipe passageway to said charging passageway to limit the pressure of fluid in the latter passageway to a value in slight excess of pressure of fluid in said control reservoir during initial charging of the equipment, auxiliary reservoir charging check valve means permitting flow of fluid under pressure from said charging passageway to said auxiliary reservoir so long as the pressure of fluid in said charging passageway exceeds the pressure of fluid in said auxiliary reservoir by a certain amount, a restricted communication connecting said auxiliary reservoir with said charging passageway in by-pass of said auxiliary reservoir charging check valve means, and auxiliary reservoir overcharge choke and check valve means responsive to preponderance in pressure of fluid in said charging communication over pressure of fluid in said brake pipe passageway to establish a restricted overcharge dissipation communication therebetween.

5. In a fluid pressure brake equipment, in combination, a brake pipe passageway adapted to be connected to a brake pipe, an auxiliary reservoir for storing brake operating fluid under pressure, a control reservoir for storing fluid at a datum pressure relative to which variations in pressure of fluid in said brake pipe passageway are utilized to control use of fluid under pressure from said auxiliary reservoir during brake application, a combined auxiliary and control reservoir charging passageway, actuator means responsive to pressure of fluid in said control reservoir and in said auxiliary and control reservoir charging passageway, first valve means operated by said actuator means for controlling admittance of fluid under pressure from said brake pipe passageway to said auxiliary and control reservoir charging passageway to limit the pressure of fluid in the latter passageway to a value in slight excess of pressure of fluid in said control reservoir during initial charging of the equipment, spring-loaded auxiliary reservoir charging check valve means permitting flow of fluid under pressure from said auxiliary and control reservoir charging passageway to said auxiliary reservoir only to the extent of a certain value less than the pressure of fluid in said auxiliary and control reservoir charging passageway, an auxiliary reservoir charging communication connecting said auxiliary reservoir to said auxiliary and control reservoir charging passageway in by-pass of said charging check valve means, a first control reservoir charging communication connecting said control reservoir to said brake pipe passageway during beginning of initial charging of the brake equipment, a second control reservoir charging communication connecting said control reservoir with said combined auxiliary and control reservoir charging passageway during initial charging of the equipment, second valve means responsive to pressure of fluid in said control reservoir to close said first control reservoir charging communication when pressure of fluid in said control reservoir is above a certain value, which value being less than its normal charge value, and respective flow restricting means associated with each of the auxiliary and control reservoir charging communications.

6. In a fluid pressure brake equipment, in combination, a brake pipe; a brake cylinder device; a control reservoir normally charged with fluid at a constant pressure; a normally charged auxiliary reservoir; means defining a one-way flow charging communication leading from said brake pipe to said auxiliary reservoir; means defining a restricted brake cylinder supply communication leading from said auxiliary reservoir to said brake cylinder device; means defining a less restricted brake cylinder supply communication leading from said auxiliary reservoir to said brake cylinder device of substantially greater flow capacity than said restricted brake cylinder supply communication; slide valve means for controlling all of the aforementioned communications, said slide valve means being actuable to an application position wherein said less restricted brake cylinder supply communication is established and said one-way flow charging communication is disestablished, and actuable to a brake cylinder maintaining position wherein said less restricted brake cylinder supply communication is disestablished, said restricted brake cylinder supply communication is established, and said one-way flow charging communication is established; and a diaphragm stack subject to pressure of fluid obtaining in said control reservoir in opposition to pressures of fluid obtaining in said brake cylinder device and in said brake pipe and operative during a brake application to actuate said slide valve first to its brake cylinder maintaining position responsively to reduction in brake cylinder pressure resultant from leakage of fluid under pressure from said brake cylinder device and then to its application position upon continued reduction in brake cylinder pressure due to leakage of fluid under pressure from said brake cylinder device at a rate greater than can be compensated for by supply of fluid under pressure to said brake cylinder device via said restricted brake cylinder supply communication.

References Cited in the file of this patent

UNITED STATES PATENTS

| | | |
|---|---|---|
| 1,819,505 | Farmer | Aug. 18, 1931 |
| 1,854,722 | Tarisien | Apr. 19, 1932 |
| 1,926,146 | Ferring | Sept. 12, 1933 |
| 1,936,966 | Kasantzeff | Nov. 28, 1933 |
| 2,165,995 | Canetta | July 11, 1939 |
| 2,661,248 | Keller | Dec. 1, 1953 |

FOREIGN PATENTS

| | | |
|---|---|---|
| 280,716 | Switzerland | May 16, 1952 |
| 688,122 | Great Britain | Mar. 12, 1952 |